United States Patent
Kim et al.

(10) Patent No.: US 11,618,351 B2
(45) Date of Patent: Apr. 4, 2023

(54) DEVICE FOR TILTING SEAT CUSHION OF FOLD AND DIVE SEAT

(71) Applicants: HYUNDAI MOTOR COMPANY, Seoul (KR); KIA MOTORS CORPORATION, Seoul (KR); Daechang Seat Co., LTD-Dongtan, Hwaseong-si (KR); HYUNDAI TRANSYS INC., Seosan-si (KR)

(72) Inventors: Mu Young Kim, Hwaseong-si (KR); Hyeok Seung Lee, Seoul (KR); Ho Suk Jung, Hwaseong-si (KR); Sang Do Park, Suwon-si (KR); Chan Ho Jung, Gunpo-si (KR); Jun Young Yun, Osan-si (KR); Kyeong Ju Kim, Hwaseong-si (KR); Jun Sik Hwang, Hwaseong-si (KR); Won Young Lee, Hwaseong-si (KR); Tae Ju Jeong, Ansan-si (KR); Myeong Su Lee, Osan-si (KR)

(73) Assignees: Hyundai Motor Company, Seoul (KR); Kia Motors Corporation, Seoul (KR); Daechang Seat Co., Ltd-Dongtan, Hwaseong-si (KR); Hyundai Transys Inc., Seosan-si (KR)

( * ) Notice: Subject to any disclaimer, the term of this patent is extended or adjusted under 35 U.S.C. 154(b) by 188 days.

(21) Appl. No.: 17/219,153

(22) Filed: Mar. 31, 2021

(65) Prior Publication Data
US 2022/0089065 A1 Mar. 24, 2022

(30) Foreign Application Priority Data
Sep. 24, 2020 (KR) .......................... 10-2020-0123921

(51) Int. Cl.
*B60N 2/23* (2006.01)
*B60N 2/30* (2006.01)
*B60N 2/02* (2006.01)

(52) U.S. Cl.
CPC ........... *B60N 2/233* (2013.01); *B60N 2/0232* (2013.01); *B60N 2/3011* (2013.01); *B60N 2002/0236* (2013.01)

(58) Field of Classification Search
CPC ........ B60N 2/233; B60N 2/23; B60N 2/0232; B60N 2/3011; B60N 2/30; B60N 2/3002;
(Continued)

(56) References Cited

U.S. PATENT DOCUMENTS 11,279,260 B2 * 3/2022 Kim ..................... B60N 2/3011
2009/0206643 A1 * 8/2009 Yamamoto ........... B60N 2/1864
297/313

(Continued)

*Primary Examiner* — Mark R Wendell
(74) *Attorney, Agent, or Firm* — Morgan, Lewis & Bockius LLP

(57) ABSTRACT

A device for tilting a seat cushion of a fold and dive seat includes: a pair of seat cushion side frames spaced apart from each other; seat back side frames connected to the pair of seat cushion side frames; a seat cushion main-frame connected to the seat back side frames; guide brackets, one of which disposed on a first side of a front portion of the seat cushion main-frame and another of which disposed on a second side of the front portion of the seat cushion main-frame, wherein each of the guide brackets has a longitudinal through-hole; a tilting support bar, both ends of which extend through the through-holes, respectively; tilting support links, each of which connected between the tilting support bar and each seat cushion side frame; a mounting bracket disposed on the front portion; and a tilting drive device disposed between the mounting bracket and the tilting support bar.

13 Claims, 9 Drawing Sheets

(58) Field of Classification Search
CPC .............. B60N 2/3004; B60N 2/3009; B60N 2002/0236
USPC ...................................................... 297/362
See application file for complete search history.

(56) References Cited

U.S. PATENT DOCUMENTS

| | | | |
|---|---|---|---|
| 2017/0080831 A1* | 3/2017 | Kaemmerer | B60N 2/3011 |
| 2019/0366886 A1* | 12/2019 | Sivaraj | B60N 2/3011 |
| 2020/0101873 A1* | 4/2020 | Cluet | B60N 2/3011 |
| 2021/0170918 A1* | 6/2021 | Kim | B60N 2/3045 |
| 2022/0105985 A1* | 4/2022 | Kim | B60N 2/43 |

* cited by examiner

[FIG. 1] - Prior Art -
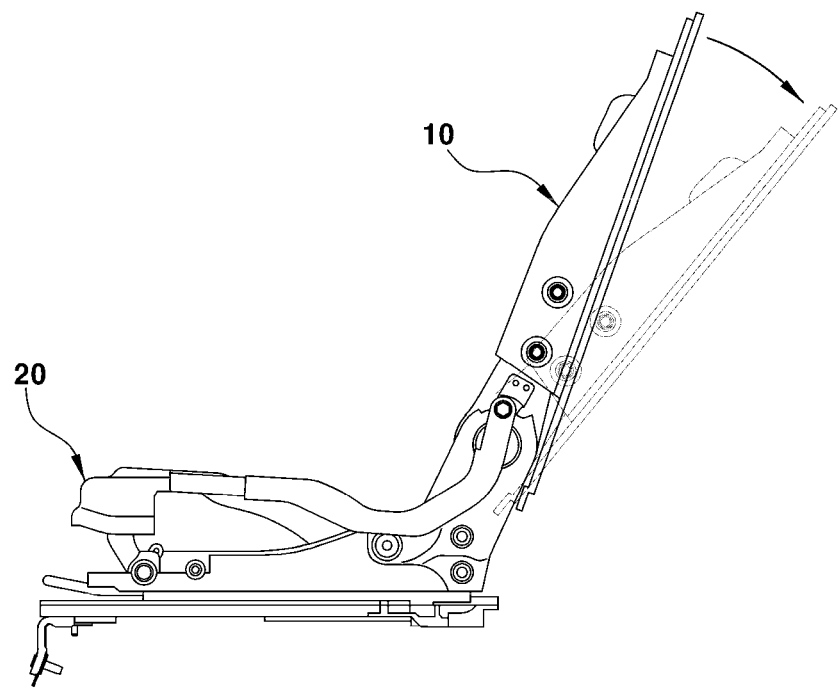

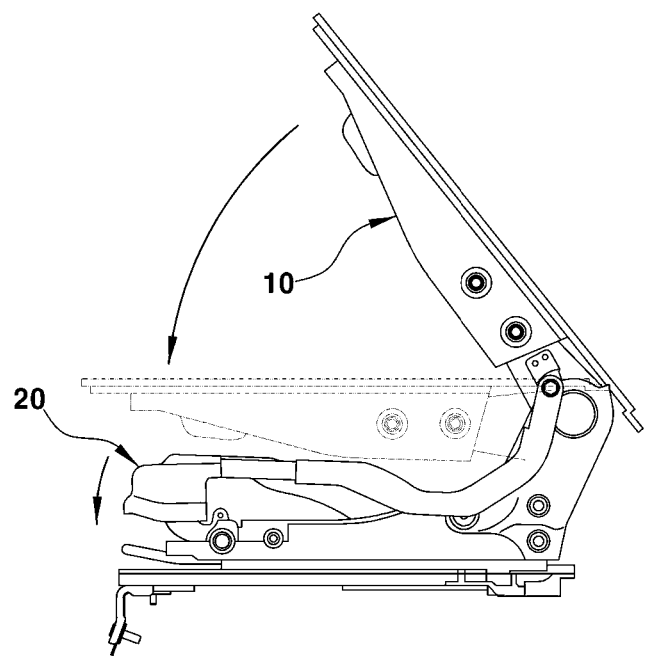
[FIG. 2] - Prior Art -

[FIG. 3]
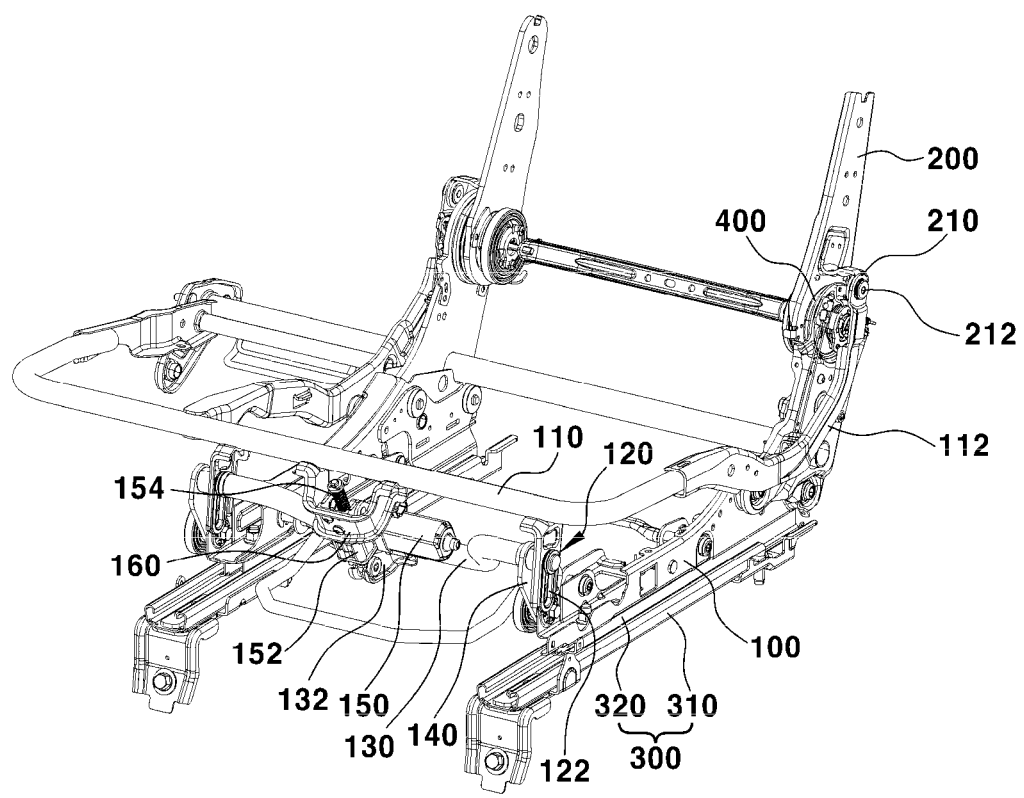

[FIG. 4]
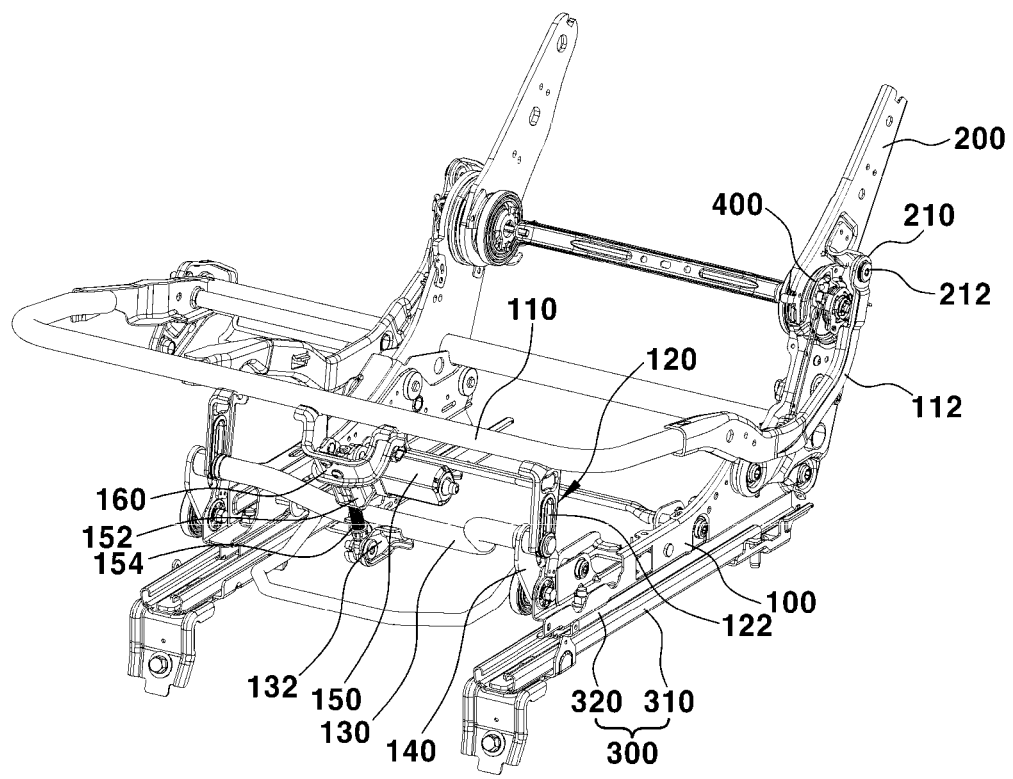

[FIG. 5]
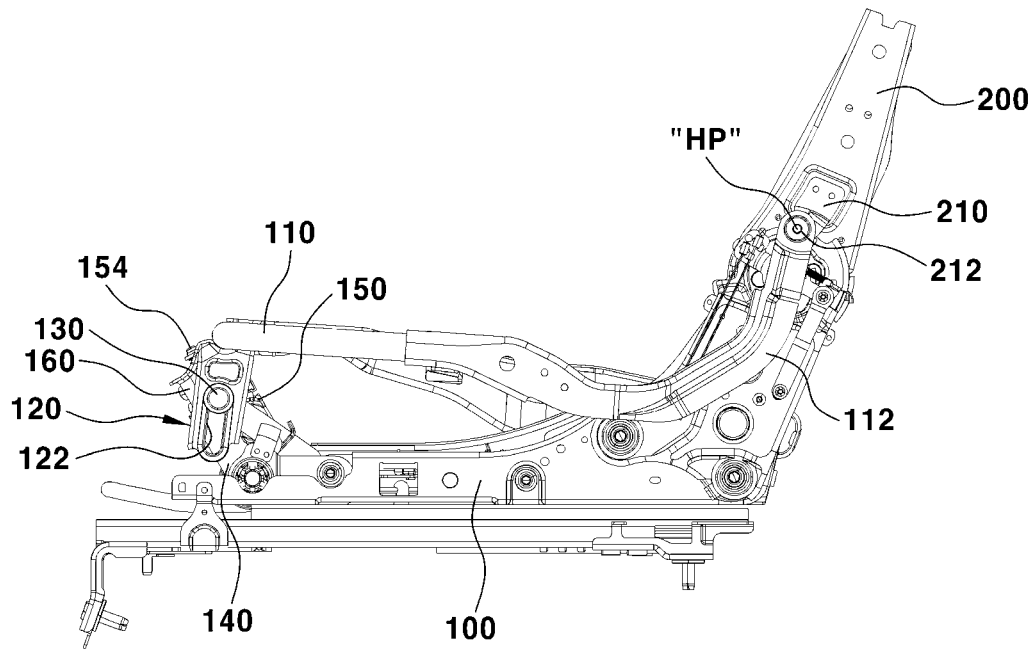
[FIG. 6]
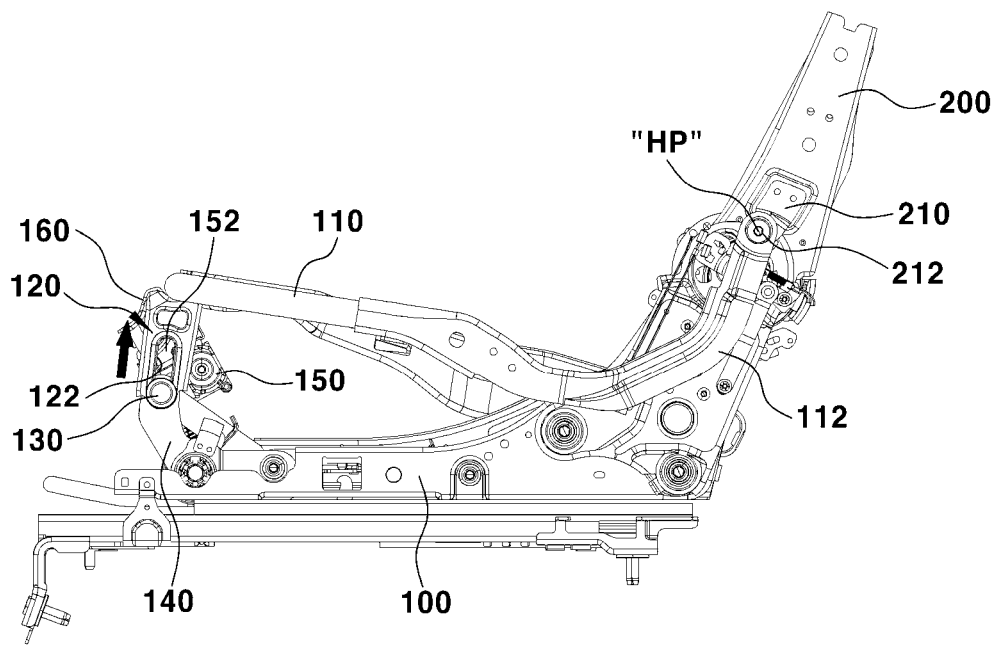

[FIG. 7]
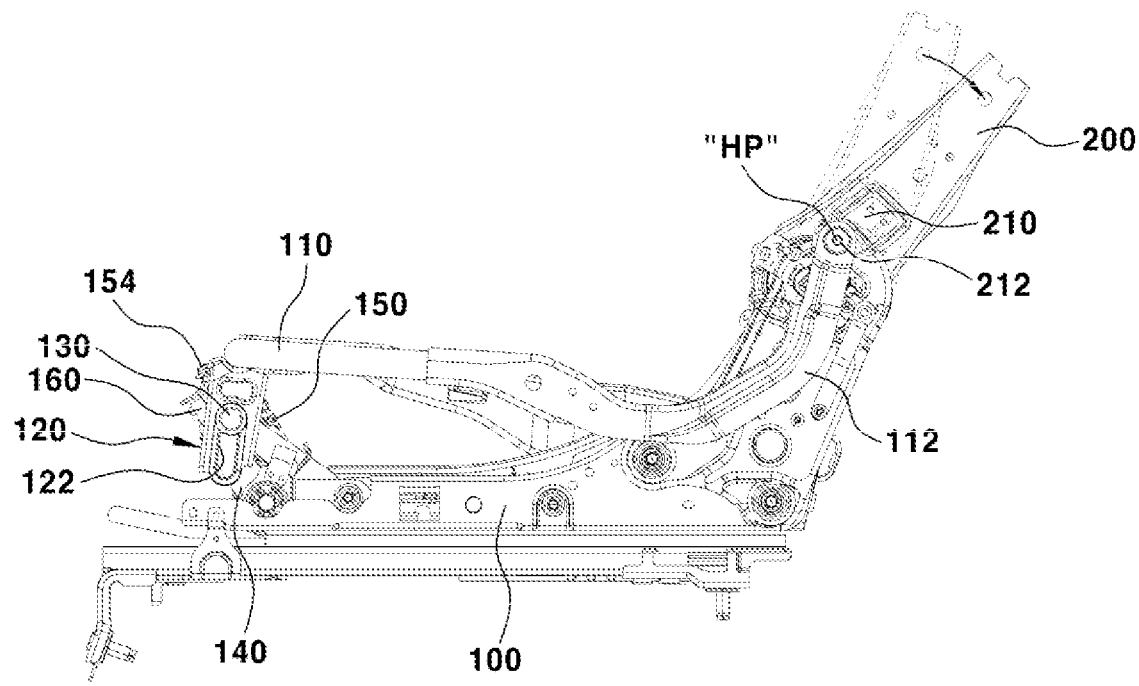
[FIG. 8]
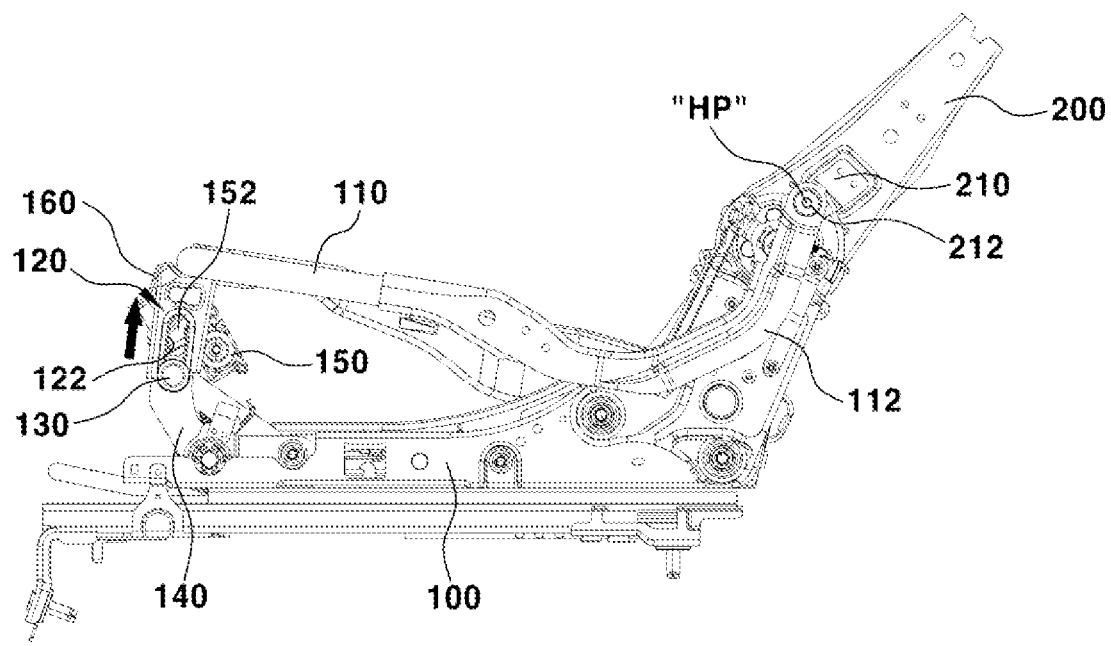

[FIG. 9A]
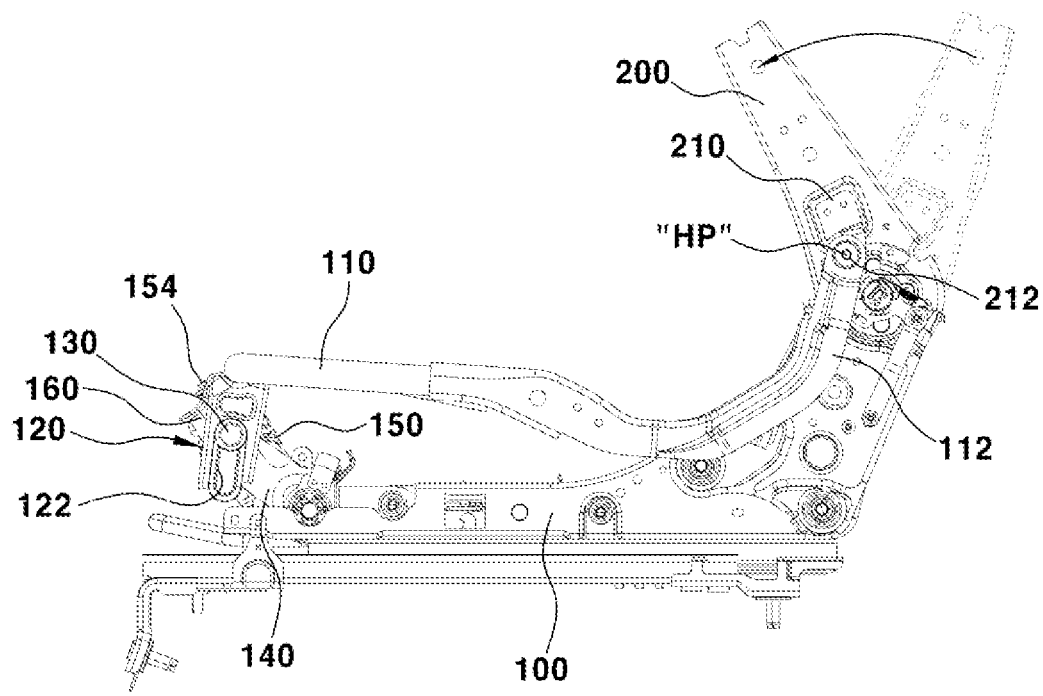
[FIG. 9B]
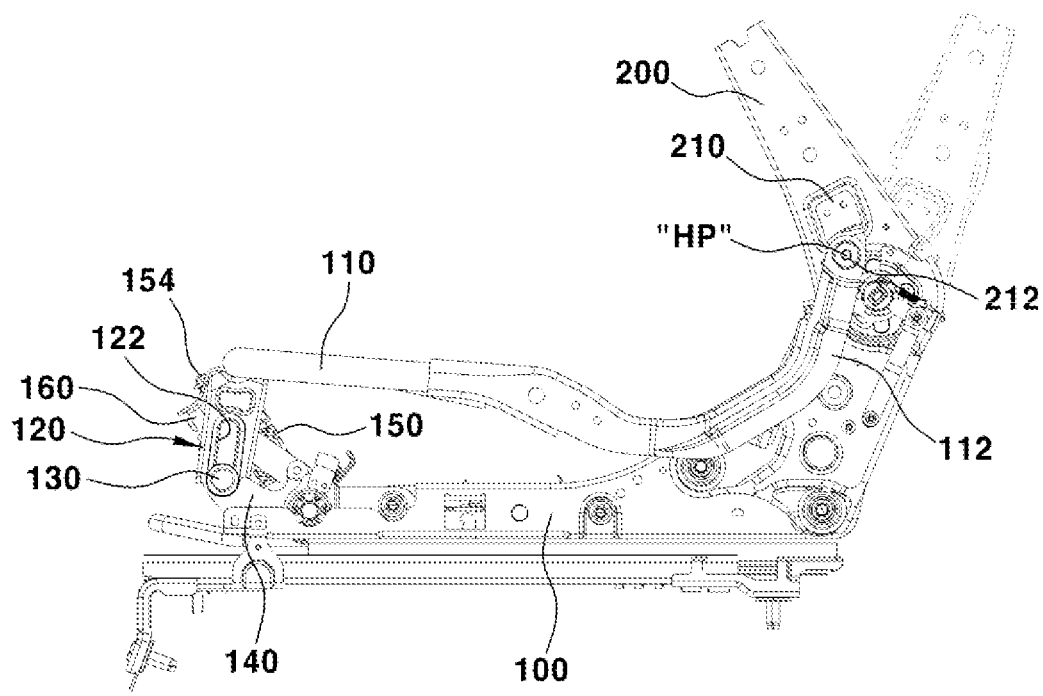

[FIG. 10]
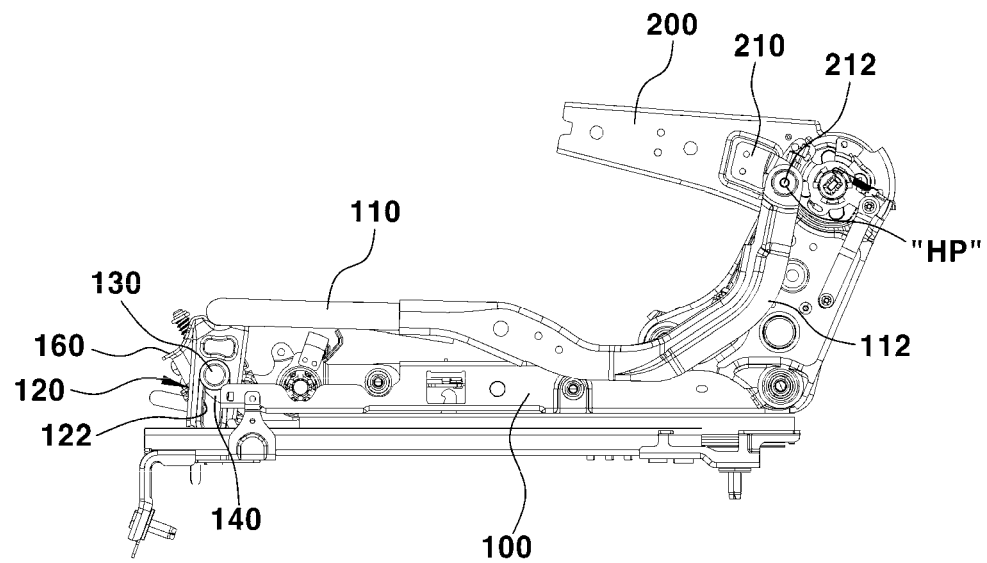
[FIG. 11A]
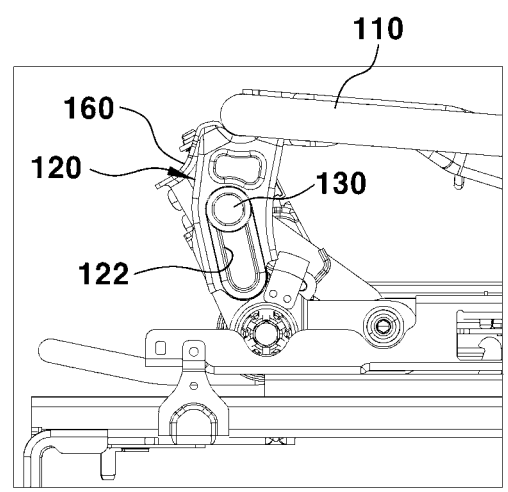

[FIG. 11B]
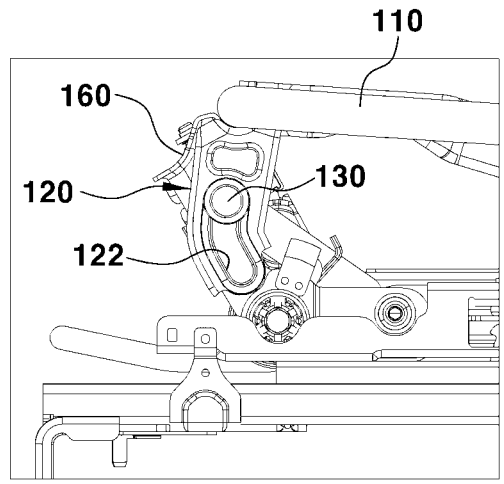
[FIG. 12]
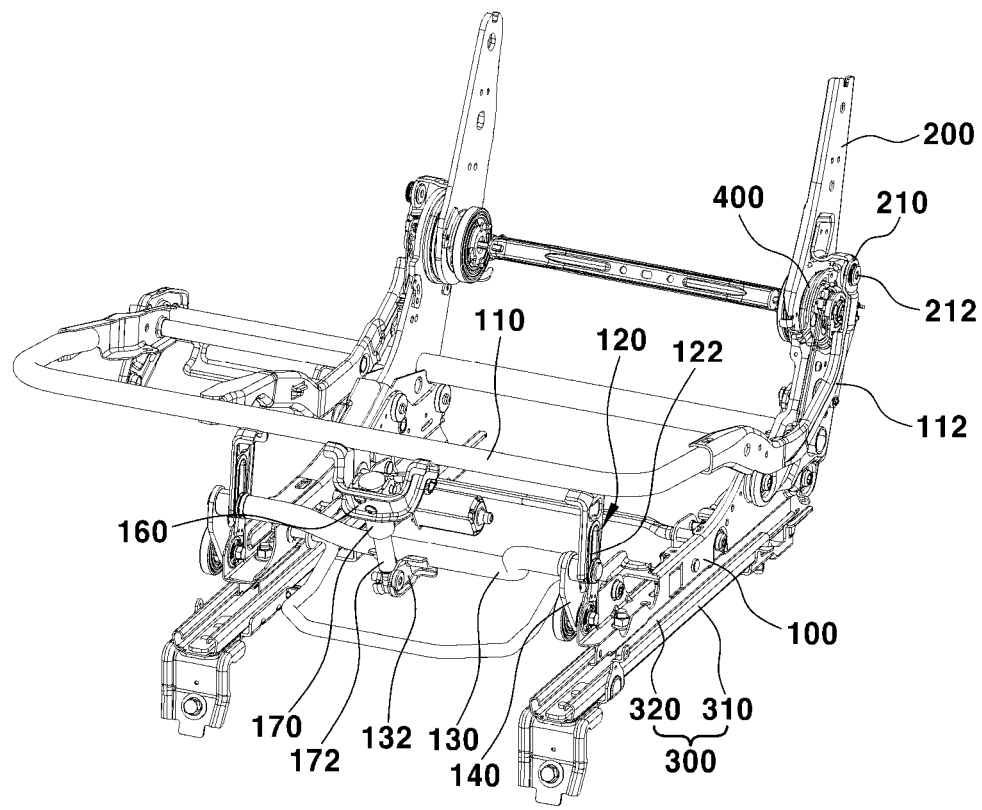

DEVICE FOR TILTING SEAT CUSHION OF FOLD AND DIVE SEAT

CROSS REFERENCE TO RELATED APPLICATION

The present application claims priority to Korean Patent Application No. 10-2020-0123921, filed Sep. 24, 2020 in the Korean Intellectual Property Office, the entire contents of which is incorporated herein for all purposes by this reference.

TECHNICAL FIELD

The present disclosure relates to a device for tilting a seat cushion of a fold and dive seat, and more particularly, to a device for tilting a seat cushion of a fold and dive seat, which is capable of tilting a seat cushion regardless of a position of a seat back in a vehicle seat having a fold and dive function.

BACKGROUND

When a user needs to load a large-sized object in space behind a car seat, e.g., a rear passenger seat, in a vehicle, a folding operation of bringing the seat such that a seat back comes into contact with a seat cushion and a dive operation of causing a front portion of the seat cushion to descend need to be carried out to secure more space behind the seat back.

In addition to the folding and dive operation for bringing the seat back into contact with the seat cushion, the vehicle seat (hereinafter "fold and dive seat") is equipped with a reclining mechanism for reclining the seat back rearward for resting and sleeping.

As illustrated in FIG. 1, in the fold and dive seat, an adjustment can be made to the rearward reclining of a seat back 10 in a normal position with the reclining mechanism. At this time, a seat cushion 20 is maintained at a normal position.

Furthermore, as illustrated in FIG. 2, in the fold and dive seat, when bringing the seat back 10 into contact with the seat cushion, a dive operation of causing a front portion of the seat cushion 20 to descend is carried out with the fold and dive mechanism in order to make a rear surface of the seat back 10 horizontally flat.

In this manner, in the fold and dive seat, a combination of the fold and dive mechanism and the seat back reclining mechanism makes it possible for an occupant to recline his/her upper body backward for comfort. However, because the seat cushion is still in a fixed state, weight of an occupant's buttocks and thighs are not supported in a distributed manner, thereby increasing fatigue of an occupant's lower body.

In other words, in the fold and dive seat, only an operation of descending a front-end portion of the seat cushion is possible when bringing the seat back into contact with the seat cushion, and the front-end portion of the seat cushion cannot ascend to a desired height when making an adjustment to the rearward reclining of the seat back. Because of this, weight of an occupant's buttocks and thighs are not supported in a distributed manner, thereby increasing fatigue of an occupant's lower body.

The foregoing is intended merely to aid in the understanding of the background of the present disclosure, and is not intended to mean that the present disclosure falls within the purview of the related art that is already known to those skilled in the art.

SUMMARY

An objective of the present disclosure is to provide a device for tilting a seat cushion of a fold and dive seat, which is capable of making an adjustment to tilting of a seat cushion independently of a position of a seat back and carrying out a tilting operation of causing a front-end portion of the seat cushion when reclining the seat back rearward in a vehicle seat equipped with a fold and dive mechanism. This device is capable of providing a position of the seat cushion, which is desired by an occupant for relaxation.

According to an aspect of the present disclosure, a device for tilting a seat cushion of a fold and dive seat includes: a pair of seat cushion side frames spaced apart from each other side by side; seat back side frames configured to be connected in a reclinable manner to rear-end portions of the seat cushion side frames, respectively; a seat cushion main-frame configured to be connected to the seat back side frames by connection frames, respectively; guide brackets, one of which disposed on a first side of a front portion of the seat cushion main-frame and another of which disposed on a second side of the front portion of the seat cushion main-frame, wherein each of the guide brackets has a longitudinal through-hole; a tilting support bar, both ends of which extend through the longitudinal through-holes in the guide brackets, respectively; tilting support links, each of which configured to be connected by a hinge mechanism between the tilting support bar and each of the seat cushion side frames; a mounting bracket disposed on a middle part of the front portion of the seat cushion main-frame; and a tilting drive device disposed between the mounting bracket and the tilting support bar.

According to another aspect of the present disclosure, a device for tilting a seat cushion of a fold and dive seat includes: a pair of seat cushion side frames spaced apart from each other side by side; seat back side frames configured to be connected in a reclinable manner to rear-end portions of the seat cushion side frames, respectively; a seat cushion main-frame configured to be connected to the seat back side frames by connection frames, respectively; guide brackets, one of which disposed on a first side of a front portion of the seat cushion main-frame and another of which disposed on a second side of the front portion of the seat cushion main-frame, wherein each of the guide brackets has a longitudinal through-hole; a tilting support bar, both ends of which extend through the longitudinal through-holes in the guide brackets, respectively; tilting support links, each of which configured to be connected by a hinge mechanism between the tilting support bar and each of the seat cushion side frames; a mounting bracket disposed on a middle part of the front portion of the seat cushion main-frame; a drive cylinder, a body of which is fixedly disposed on the mounting bracket; and a piston disposed in the drive cylinder in a linearly reciprocating manner and configured to be fastened by the hinge mechanism to the tilting support bar.

In the device, the connection frames, extending from rear-end portions, respectively, of the seat cushion main-frame, may be fastened by the hinge mechanism to hinge brackets mounted on the seat back side frames respectively using hinge pins.

In the device, lower portions of the seat cushion side frames may be mounted on moving rails, respectively of seat rails.

In the device, each of the guide brackets may be shaped like a plate and may extend vertically in a straight line, or each of the guide brackets may be shaped like a plate and a portion thereof, having the longitudinal through-hole, may extend obliquely in a straight line in a rearward direction.

In the device, each of the longitudinal through-holes may extend vertically in a straight line or may extend from top down in a curved line in a rearward direction.

In the device, a connection bracket, to which a lower end portion of the lead screw is connected by the hinge mechanism or the piston of the drive cylinder is connected by the hinge mechanism, may be mounted on the tilting support bar.

A device for tilting a seat cushion of a fold and dive seat according to the present disclosure provides the following advantages.

Firstly, an operation of reclining a seat back for a fold and dive seat and a seat cushion tilting operation of making an adjustment to ascending and descending of a front-end portion of the seat cushion regardless of a reclining position of the seat back are possible. Thus, a position of the seat cushion, which is desired by an occupant for relaxation, can be provided. Weight of an occupant's buttocks and thighs can be supported in a distributed manner, thereby decreasing fatigue of an occupant's lower body.

Secondly, the seat cushion tilting operation of making an adjustment to ascending and descending of the front-end portion of the seat cushion is carried out at the same time as the operation of reclining the seat back rearward. Thus, the position of the seat cushion, which is desired by an occupant for rest and relaxation, can be provided.

BRIEF DESCRIPTION OF THE DRAWINGS

The above and other objectives, features, and other advantages of the present disclosure will be more clearly understood from the following detailed description when taken in conjunction with the accompanying drawings, in which:

FIGS. 1 and 2 are views each schematically illustrating a fold and dive seat in the related art;

FIG. 3 is a perspective view illustrating a state where a device for tilting a seat cushion of a fold and dive seat according to an embodiment of the present disclosure has not yet started to carry out a tilting operation;

FIG. 4 is a perspective view illustrating a state where the device for tilting a seat cushion of a fold and dive seat according to an embodiment of the present disclosure finishes carrying out the tilting operation;

FIG. 5 is a side view illustrating the state where the device for tilting a seat cushion of a fold and dive seat according to an embodiment of the present disclosure has not started to carry out the tilting operation;

FIG. 6 is a side view illustrating the state where the device for tilting a seat cushion of a fold and dive seat according to an embodiment of the present disclosure finishes carrying out the tilting operation;

FIG. 7 is a side view illustrating that the device for tilting a seat cushion of a fold and dive seat according to an embodiment of the present disclosure carries out only rearward reclining of a seat back;

FIG. 8 is a side view illustrating that the device for tilting a seat cushion of a fold and dive seat according to an embodiment of the present disclosure carries out tilting of a seat cushion at the same time as making an adjustment to the rearward reclining of the seat back;

FIGS. 9A and 9B are side views each illustrating a state where the device for tilting a seat cushion of a fold and dive seat according to an embodiment of the present disclosure carries out an operation of tilting the seat cushion downward when rotating the seat back frontward for an entering occupant;

FIG. 10 is a side view illustrating a state where the device for tilting a seat cushion of a fold and dive seat according to an embodiment of the present disclosure carries out the operation of tilting the seat cushion downward when bringing the seat back into contact with the seat cushion;

FIGS. 11A and 11B are side views each illustrating an example where a structure of a guide bracket that constitutes the device for tilting a seat cushion of a fold and dive seat according to an embodiment of the present disclosure is changed; and FIG. 12 is a perspective view illustrating another embodiment of an actuator that constitutes the device for tilting a seat cushion of a fold and dive seat according to the present disclosure.

DETAILED DESCRIPTION

The present disclosure will be described in detail below with reference to the accompanying drawings.

FIGS. 3 and 5 each illustrate a state where a device for tilting a seat cushion of a fold and dive seat according to an embodiment of the present disclosure does not yet start to carry out a tilting operation (a state where a front-end portion of a seat cushion descends to a minimum of height). FIGS. 4 and 6 each illustrate a state where a device for tilting a seat cushion of a fold and dive seat according to an embodiment of the present disclosure finishes carrying out the tilting operation (a state where the front-end portion of the seat cushion ascends to a maximum of height).

The fold and dive seat includes a pair of seat cushion side frames 100, seat back side frames 200, and a seat cushion main-frame 110. The seat cushion side frames 100 are positioned side by side a distance away from each other. The seat back side frames 200 are fasted to rear-end portions of the seat cushion side frames 100, respectively, in such a manner that a reclining device 400 possibly adjusts angles of the seat back side frames 200 counterclockwise and clockwise. The seat cushion main-frame 110 is rotatably fastened by a hinge mechanism to the seat back side frames 200.

In this case, connection frames 112, which extend to the seat back side frames 200, respectively, are integrally combined with rear-end portions, respectively, of the seat cushion main-frame 110. The connection frames 112 are fastened by the hinge mechanism to hinge brackets 210 mounted on the seat back side frames 200 respectively using hinge pins 212.

Reference numeral 300 depicts a seat rail in FIGS. 3 and 4.

Each of the seat rails 300 includes a stationary rail 310, fixed to a floor panel, and a moving rail 320, mounted on the stationary rail 310 in a manner that is slidable backward and forward. Here, lower portions of the seat cushion side frames 100 may be mounted on the moving rails 320, respectively, of the seat rails 300. Thus, backward and forward motions of the seat may be controlled.

Guide brackets 120, which are shaped like a vertically longitudinal plate, are mounted on both sides, respectively, of a front portion of the seat cushion main-frame 110. Each of the guide brackets 120 has a longitudinal through-hole 122 that extends vertically.

Both end portions, positioned on the left and right sides, of a tilting support bar 130 are inserted into the longitudinal through-holes 122, respectively, in the guide brackets 120.

A middle portion of the tilting support bar 130 has the shape of a "U" and is positioned obliquely in a rearward direction in order to readily secure a space for positioning and mounting a motor 150 and a gear box 152.

Tilting support links 140 are connected between one end portion of the tilting support bar 130 and a front-end portion of one seat cushion side frame 100, and between the other end portion of the tilting support bar 130 and a front-end portion of the other seat cushion side frame 100, respectively, in such a manner that is rotatable in the backward-forward direction.

It is desirable that the end portions of the tilting support bar 130 are inserted for fastening into upper end portions, respectively, of the tilting support links 140 in such a manner that the tilting support links 140 are rotatable, and that lower end portions of the tilting support links 140 are rotatably fastened by a hinge mechanism to the front-end portions, respectively, of the seat cushion side frames 100.

A mounting bracket 160, which is U-shaped, is mounted on a middle part of the front portion of the seat cushion main-frame 110. The motor 150 and the gear box 152, which are employed as tilting drive devices, are fixedly mounted on the mounting bracket 160.

In this case, the gear box 152 is integrally combined with an output shaft of the motor 150. The motor 150 and the gear box 152 are positioned to be substantially obliquely upward facing a frontward direction, with a body of the gear box 152 being fixedly mounted on the mounting bracket 160.

Particularly, a lead screw 154 is screwed into the gear box 152 in a manner that passes through the gear box 152. The gear box 152 reduces a rotary motion produced by the motor 150 and outputs the resulting rotary motion. A lower end portion of the lead screw 154 is connected by the hinge mechanism to the tilting support bar 130.

It is desirable that a connection bracket 132 for connection to the lead screw 154 is mounted on the tilting support bar 130 and that the lower end portion of the lead screw 154 is connected by the hinge mechanism to the connection bracket 132.

In this case, a well-known gear train, which is not illustrated, may be built into the gear box 152. The gear train includes an output gear that is rotated along a threaded surface of the lead screw 154 for ascending or descending.

Accordingly, when the rotary motion produced by the motor 150 is output to an output gear within the gear box 152, the output gear is rotated along the threaded surface of the lead screw 154 for ascending or descending, without the lead screw 154 being rotated. Thus, the gear box 152 including the output gear and the motor 150 integrally combined with the gear box 152 ascend or descend.

At the same time, a tilting operation in which the front portion of the seat cushion main-frame 110 ascends or descends at the same time as the gear box 152 is carried out because the body of the gear box 152 is fixedly mounted on the mounting bracket 160 mounted on the middle part of the front portion of the seat cushion main-frame 110.

A flow for operation of the device for tilting a seat cushion of a hold and dive seat according to the present disclosure, which is configured as described above, will be described below.

With reference to FIGS. 3 and 5, at reference positions of the seat cushion and a seat back, that is, at neutral positions (reference positions) where adjustments are not made to tilting of the seat cushion and to reclining of the seat back, both end portions of the tilting support bar 130 are positioned in uppermost portions, respectively, of the longitudinal through-holes 122 in the guide brackets 120.

In addition, the gear box 152 descends to a lowermost portion of the threaded surface of the lead screw 154.

At the neutral positions, when a rotary motion in a first direction, which is produced by the motor 150, is output to the output gear within the gear box 152, the output gear is rotated along the threaded surface of the lead screw 154 for ascending, without the lead screw 154 being rotated. Furthermore, as illustrated in FIGS. 4 and 6, the gear box 152 including the output gear and the motor 150 integrally combined with the gear box 152 ascend.

At the same time, the tilting operation in which the front portion of the seat cushion main-frame 110 ascends at the same time as the gear box 152 because the body of the gear box 152 is fixedly mounted on the mounting bracket 160 mounted on the middle part of the front portion of the seat cushion main-frame 110.

FIGS. 7 and 8 each illustrate the device for tilting a seat cushion of a fold and dive seat according to an embodiment of the present disclosure. FIG. 7 is a side view illustrating that only an operation of reclining the seat back rearward is carried out. FIG. 8 is a side view illustrating that the operation of reclining the seat back rearward and the tilting operation of causing the front-end portion of the seat cushion to ascend are carried out at the same time.

At the neutral positions (reference positions) where adjustments are not made to the tilting of the seat cushion and to the reclining of the seat back, as illustrated in FIG. 7, only an adjustment is made to the rearward reclining of the seat back.

That is, an adjustment is made to the rearward reclining of the seat back independently of whether or not an adjustment is made to the tilting of the seat cushion, because the seat back side frame 200 is fastened to the rear-end portion of the seat cushion side frame 100 in such a manner that the motor-driven reclining device 400 possibly adjusts the angle of the seat back side frame 200 counterclockwise and clockwise.

Thus, when an adjustment is made to the reclining of the seat back, an occupant can keep his/her upper body bent more backward for rest and relaxation. However, because the seat cushion is still in a fixed state, weight of an occupant's buttocks and thighs are not supported in a distributed manner, thereby increasing fatigue of an occupant's lower body.

In order to overcome this disadvantage, as illustrated in FIG. 8, the tilting operation of causing the front-end portion of the seat cushion to ascend is carried out at the same time as the seat back is reclined rearward.

To this end, the motor 150 is powered on at the same as the motor-driven reclining device 400 is powered on to carry out the operation of reclining the seat back rearward.

Accordingly, as described above, when the rotary motion in the first direction, which is produced by the motor 150, is output to the output gear within the gear box 152, the output gear is rotated along the threaded surface of the lead screw 154 for ascending, without the lead screw 154 being rotated. Furthermore, the gear box 152 including the output gear and the motor 150 integrally combined with the gear box 152 ascend.

At the same time, the tilting operation in which the front portion of the seat cushion main-frame 110 ascends at the same time as the gear box 152 because the body of the gear box 152 is fixedly mounted on the mounting bracket 160 mounted on the middle part of the front portion of the seat cushion main-frame 110.

Accordingly, the tilting operation of causing the front-end portion of the seat cushion to ascend is carried out when an adjustment is made to the rearward reclining of the seat back. Thus, the weight of the occupant's buttocks and thighs can be readily supported in a distributed manner, thereby preventing an increase in the fatigue of the occupant's lower body. With the tilting operation, the occupant can feel comfortable and relaxed.

FIGS. 9A and 9B are side views each illustrating a state where the device for tilting a seat cushion of a fold and dive seat according to an embodiment of the present disclosure carries out an operation of tilting the front-end portion of the seat cushion downward when rotating the seat back frontward for an entering occupant.

With reference to FIGS. 9A and 9B, the front-end portion of the seat cushion is tilted downward when rotating the seat back frontward for an entering occupant to secure a space for an occupant to get in or get out of the vehicle (for example, when rotating a seat back in the second row frontward to provide a space sufficient for the occupant siting on a seat in the second or third row to get in or get out of the vehicle).

When the seat back side frame 200 is rotated frontward to make an adjustment to the frontward rotation of the seat back, a hinge point (HP) is moved forward. The connection frame 112 connected to the rear-end portion of the seat cushion main-frame 110 is fastened to the seat back side frame 200 with the hinge bracket 210 in between in a manner that is rotatable about the hinge point (HP).

More specifically, the hinge point (HP) about which the connection frame 112 connected to the rear-end portion of the seat cushion main-frame 110 is rotatable in a state of being fastened to the seat back side frame 200 with the hinge bracket 210 in between is moved more forward, when the seat back illustrated in FIG. 9A is rotated frontward, than a hinge point (HP) about which the connection frame 112 connected to the rear-end portion of the seat cushion main-frame 110 is rotatable in the state of being fastened to the seat back side frame 200 with the hinge bracket 210 in between, at the neutral (reference) positions illustrated in FIG. 5.

Accordingly, as illustrated in FIG. 9A, the seat cushion main-frame 110 and the connection frame 112 are pushed frontward, and the guide bracket 120 mounted on the seat cushion main-frame 110 is also pushed frontward. At the same time, the tilting support bar 130 inserted into the longitudinal through-hole 122 in the guide bracket 120 rotates the tilting support link 140 frontward. Thus, the tilting operation of causing the front portion of the seat cushion main-frame 110 to descend is carried out.

Even after the tilting operation of causing the front portion of the seat cushion main-frame 110 to ascend is carried out, when rotating the seat back frontward for an entering occupant, the tilting operation of causing the front portion of the seat cushion main-frame 110 to descend is carried out, as illustrated in FIG. 9B.

More particularly, when the seat back side frame 200 is rotated frontward to make an adjustment to the frontward rotation of the seat back, the seat cushion main-frame 110 and the connection frame 112 are pushed frontward, as illustrated in FIG. 9B, and the guide bracket 120 mounted on the seat cushion main-frame 110 is also pushed frontward. At the same time, the tilting support bar 130 inserted into the longitudinal through-hole 122 in the guide bracket 120 rotates the tilting support link 140, pushing the tilting support link 140 frontward. As a result, the tilting operation of causing the front portion of the seat cushion main-frame 110 to descend is carried out.

In this manner, even when rotating the seat back frontward for an entering occupant, the operation of tilting the seat cushion downward is readily carried out independently.

FIG. 10 is a side view illustrating a state where the device for tilting a seat cushion of a fold and dive seat according to the present disclosure carries out the operation of tilting the seat cushion downward when bringing the seat back into contact with the seat cushion.

As illustrated in FIG. 10, when bringing the seat back into close contact with the seat cushion, a dive operation of tilting the front-end portion of the seat cushion downward is carried out. Thus, an upper surface of the seat cushion is flattened in such a manner that the seat back is readily brought into close contact with the seat cushion.

When the seat back side frames 200 are rotated frontward in order to bring the seat back into contact with the seat cushion, as illustrated in FIG. 10, the hinge point (HP) is moved forward further. The connection frame 112 connected to the rear-end portion of the seat cushion main-frame 110 is rotatable about the hinge point (HP) in a state of being fastened to the seat back side frame 200 with the hinge bracket 210 in between.

Accordingly, the seat cushion main-frame 110 and the connection frame 112 are pushed farther frontward, and the guide bracket 120 mounted on the seat cushion main-frame 110 is also pushed farther frontward. At the same time, the tilting support bar 130 inserted into the longitudinal through-hole 122 in the guide bracket 120 rotates the tilting support link 140 more widely frontward. Thus, as illustrated in FIG. 10, the tilting operation is carried out so that the front portion of the seat cushion main-frame 110 descends farther than when the back seat is rotated frontward for an entering occupant.

In this manner, as a result of carrying out the tilting operation, the front portion of the seat cushion main-frame 110 descends father, when the seat back is brought into contact with the seat cushion, than when the back seat is rotated frontward for an entering occupant. Thus, the seat cushion main-frame 110 becomes in a horizontal state along the backward-forward direction. Thus, the upper surface of the seat cushion enters into a flat state, and the seat back can be readily brought into contact with the seat cushion in a parallel manner.

The guide bracket 120, as illustrated in FIGS. 1 to 7, is shaped like a plate and extends vertically in a straight line. However, as illustrated in FIG. 11A, the guide bracket 120 may be shaped like a plate and a portion thereof, having the longitudinal through-hole 122, may extend obliquely in a straight line in a rearward direction.

The longitudinal through-hole 122 in the guide bracket 120, as illustrated in FIGS. 3 to 7, extends vertically in a straight line. However, as illustrated in FIG. 11B, the guide bracket 120 may be shaped like a plate, and a portion thereof, having the longitudinal through-hole 122, may extend in a curved line in the rearward direction. Accordingly, the longitudinal through-hole 122 may also extend from top down in a curved line in the rearward direction.

In this manner, the guide bracket 120 and the longitudinal through-hole 122 may vary in shape. Thus, a path along which the seat cushion main-frame 110 is tilted as described above may vary according to types of vehicles and to specifications.

In the above-described embodiment of the present disclosure, the motor 150, the gear box 152, and the lead screw 154 are described as constituting the tilting drive device (tilting mechanism) for tilting the seat cushion main-frame 110. A hydraulic and pneumatic cylinder and a gas damper cylinder, which include a linear reciprocating piston, and various actuators may be used as tilting drive devices.

FIG. 12 is a perspective view illustrating another embodiment of the tilting drive device that constitutes the device for tilting a seat cushion of a fold and dive seat according to the present disclosure.

As illustrated in FIG. 12, a body of a drive cylinder 170, which is a type of gas damper, is fixedly mounted on the mounting bracket 160 mounted on the middle part of the front portion of the seat cushion main-frame 110.

The drive cylinders 170 include hydraulic and pneumatic cylinder, and a gas damper cylinder.

In addition, the piston 172 of the drive cylinder 170 is connected by the hinge mechanism to the connection bracket 132 mounted on the tilting support bar 130.

Accordingly, when the piston 172 of the drive cylinder 170 is driven forward in a state of being supported on the connection bracket 132, the drive cylinder 170 is pushed to ascend, and at the same time, the front portion of the seat cushion main-frame 110 is tilted to ascend.

In this manner, when an actuator for tilting the seat cushion main-frame 110 is employed as the drive cylinder 170 having the piston 172, the seat cushion main-frame 110 is also tilted as is the case when the motor 150, the gear box 152, and the lead screw 154 are used.

Although the specific embodiment of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. A device for tilting a seat cushion of a fold and dive seat, the device comprising:
    a pair of seat cushion side frames spaced apart from each other side by side;
    seat back side frames configured to be connected in a reclinable manner to rear-end portions of the pair of seat cushion side frames, respectively;
    a seat cushion main-frame configured to be connected to the seat back side frames by connection frames, respectively;
    guide brackets, one of which disposed on a first side of a front portion of the seat cushion main-frame and another of which disposed on a second side of the front portion of the seat cushion main-frame, wherein each of the guide brackets has a longitudinal through-hole;
    a tilting support bar, both ends of which extend through the longitudinal through-holes in the guide brackets, respectively;
    tilting support links, each of which configured to be connected by a hinge mechanism between the tilting support bar and each of the pair of seat cushion side frames;
    a mounting bracket disposed on a middle part of the front portion of the seat cushion main-frame; and
    a tilting drive device disposed between the mounting bracket and the tilting support bar.

2. The device of claim 1, wherein the connection frames, extending from rear-end portions, respectively, of the seat cushion main-frame, are configured to be fastened by the hinge mechanism to hinge brackets disposed on the seat back side frames respectively by hinge pins.

3. The device of claim 1, wherein lower portions of the pair of seat cushion side frames are disposed on moving rails, respectively, of seat rails.

4. The device of claim 1, wherein each of the guide brackets has a plate shape and extends vertically in a straight line,
    each of the guide brackets has a plate shape and a portion thereof, having the longitudinal through-hole, extends obliquely in a straight line in a rearward direction, or
    each of the guide brackets has a plate shape and a portion thereof, having the longitudinal through-hole, extends in a curved line in the rearward direction.

5. The device of claim 1, wherein each of the longitudinal through-holes extends vertically in a straight line or extends from top to bottom in a curved line in a rearward direction.

6. The device of claim 1, wherein the tilting drive device comprises:
    a motor and a gear box, bodies of which are disposed on the mounting bracket; and
    a lead screw coupled rotatably to the gear box and connected by the hinge mechanism to the tilting support bar.

7. The device of claim 6, wherein a connection bracket, to which a lower end portion of the lead screw is configured to be connected by the hinge mechanism, is disposed on the tilting support bar.

8. A device for tilting a seat cushion of a fold and dive seat, the device comprising:
    a pair of seat cushion side frames spaced apart from each other side by side;
    seat back side frames configured to be connected in a reclinable manner to rear-end portions of the pair of seat cushion side frames, respectively;
    a seat cushion main-frame configured to be connected to the seat back side frames by connection frames, respectively;
    guide brackets, one of which disposed on a first side of a front portion of the seat cushion main-frame and another of which disposed on a second side of the front portion of the seat cushion main-frame, wherein each of the guide brackets has a longitudinal through-hole;
    a tilting support bar, both ends of which extend through the longitudinal through-holes in the guide brackets, respectively;
    tilting support links, each of which configured to be connected by a hinge mechanism between the tilting support bar and each of the pair of seat cushion side frames;
    a mounting bracket disposed on a middle part of the front portion of the seat cushion main-frame;
    a drive cylinder, a body of which is disposed on the mounting bracket; and
    a piston disposed in the drive cylinder in a linearly reciprocating manner and configured to be fastened to the tilting support bar by the hinge mechanism.

9. The device of claim 8, wherein the connection frames, extending from rear-end portions, respectively, of the seat cushion main-frame, are configured to be fastened by the hinge mechanism to hinge brackets, which are disposed on the seat back side frames respectively using hinge pins.

10. The device of claim 8, wherein lower portions of the pair of seat cushion side frames are disposed on moving rails, respectively, of seat rails.

11. The device of claim 8, wherein each of the guide brackets has a plate shape and extends vertically in a straight line,
    each of the guide brackets has a plate shape and a portion thereof, having the longitudinal through-hole, extends obliquely in a straight line in a rearward direction, or each of the guide brackets has a plate shape and a portion thereof, having the longitudinal through-hole, extends in a curved line in the rearward direction.

12. The device of claim 8, wherein each of the longitudinal through-holes extends vertically in a straight line or extends from top to bottom in a curved line in a rearward direction.

13. The device of claim 8, wherein a connection bracket to which the piston of the drive cylinder is connected by the hinge mechanism is disposed on the tilting support bar.

* * * * *